United States Patent [19]

Boyer et al.

[11] 4,223,071
[45] Sep. 16, 1980

[54] HIGH VOLTAGE INSULATING COMPOSITIONS CONTAINING PHOSPHORUS COMPOUNDS

[75] Inventors: Nicodemus E. Boyer, Redwood City, Calif.; Travers K. Cammack, II, Bartlesville, Okla.; David D. Nyberg, Sunnyvale, Calif.

[73] Assignee: Raychem Corporation, Menlo Park, Calif.

[21] Appl. No.: 869,268

[22] Filed: Jan. 13, 1978

[51] Int. Cl.$^2$ .............................................. H01B 3/00
[52] U.S. Cl. ..................................... 428/411; 252/63; 252/63.2; 252/63.5; 252/63.7; 260/45.7 P; 260/45.7 PS; 260/45.7 PH; 174/137 B; 174/138 C; 174/110 R; 174/110 S; 174/110 E
[58] Field of Search ....................... 252/63, 63.2, 63.5, 252/63.7; 260/45.7 PS, 45.7 P, 45.7 PH; 428/411; 174/137 B, 138 C, 110 R, 110 S, 110 E

[56] References Cited

U.S. PATENT DOCUMENTS

| | | | |
|---|---|---|---|
| 2,553,643 | 5/1951 | Ellerhorst | 210/45.7 P |
| 2,768,264 | 10/1956 | Jones et al. | 200/151 |
| 2,997,526 | 8/1961 | Kessel et al. | 174/137 B |
| 2,997,527 | 8/1961 | Kessel et al. | 174/137 B |
| 2,997,528 | 8/1961 | Kessel et al. | 174/137 B |
| 3,035,209 | 5/1962 | Smith | 174/137 B |
| 3,192,347 | 6/1965 | Stringfellow et al. | 174/138 C |
| 3,280,070 | 10/1966 | Battista et al. | 260/45.7 PS |
| 3,285,954 | 10/1966 | Uhing | 260/45.7 PS |
| 3,325,444 | 6/1967 | Best et al. | 260/45.7 PS |
| 3,339,013 | 8/1967 | Gainer et al. | 174/137 B |
| 3,420,792 | 1/1969 | Zuccaro | 260/45.9 NP |
| 3,475,546 | 10/1969 | Sadler | 174/137 B |
| 3,586,802 | 6/1971 | Nichols et al. | 200/151 |
| 3,622,537 | 11/1971 | Needham | 252/63.5 |
| 3,626,083 | 12/1971 | Minter et al. | 174/137 B |
| 3,645,899 | 2/1972 | Linson | 174/137 B |
| 3,649,542 | 3/1972 | Hasebe et al. | 252/63.7 |
| 3,676,393 | 7/1972 | Piirma | 260/45.7 PS |
| 3,793,473 | 2/1974 | Pointer | 252/63.7 |
| 3,875,264 | 1/1975 | Hofer et al. | 260/45.7 PS |
| 3,898,372 | 8/1975 | Kalb | 174/137 B |
| 3,935,157 | 1/1976 | Schiller et al. | 174/137 B |
| 3,992,352 | 11/1976 | Murch | 260/45.9 NP |
| 4,001,128 | 1/1977 | Penneck | 252/63.5 |
| 4,058,471 | 11/1977 | Glatti | 252/63.5 |
| 4,100,089 | 7/1978 | Cammack et al. | 252/63 |

FOREIGN PATENT DOCUMENTS 47-2190 of 1972 Japan .................................... 252/63.7
1337951 11/1973 United Kingdom .
1337951 11/1973 United Kingdom .

OTHER PUBLICATIONS

Harper, Handbook of Wiring, Cabling and Interconnections for Electronics, McGraw-Hill, 1973, pp. 6-25 and 6-26.
Modern Plastics Ency., 1973-1974, pp. 232, 233, 236.
Condensed Chemical Dictionary, 8th Ed., Van Nostrand Reinhold Co., ©1971, p. 687.

Primary Examiner—John D. Smith
Attorney, Agent, or Firm—Lyon & Lyon

[57] ABSTRACT

New high voltage insulating compositions are disclosed. The compositions comprise a polymer (e.g. a polysiloxane, epoxide resin or a polymer of one or more olefins or substituted olefins), an antitracking additive (e.g. an alumina hydrate), and certain phosphorus-containing compounds which have been found to provide the compositions with greatly improved resistance to erosion by high voltage stress. The phosphorus-containing compounds include phosphonates, phosphates, phosphites, phosphinates, phosphonites, phosphinites, phosphine oxides and sulfides, and phosphines, and salts and complexes thereof. The phosphorus-containing compound can react in situ with the polymer or other ingredients of the composition.

17 Claims, No Drawings

HIGH VOLTAGE INSULATING COMPOSITIONS CONTAINING PHOSPHORUS COMPOUNDS

CROSS-REFERENCE TO RELATED APPLICATIONS

Certain of the subject matter described herein is claimed in the commonly assigned application Ser. No. 869,244 filed contemporaneously with this application by David Dolph Nyberg and Travers Kregg Cammack II as a continuation-in-part of their earlier application Ser. No. 649,797, now U.S. Pat. No. 4,100,089, commonly assigned application Ser. No. 869,269 filed contemporaneously with this application by Bernard John Lyons, Travers Kregg Cammack II and David Dolph Nyberg.

BACKGROUND OF THE INVENTION

1. Field of the Invention

This invention relates to polymeric compositions suitable for use as high voltage insulating materials.

2. Summary of the Prior Art

Failure of polymeric insulating materials through tracking is caused by the formation of a dendritic carbonaceous path on the surface of material. It is known to incorporate anti-tracking additives into polymers, and it has been found that alumina hydrates, especially alumina trihydrate, $Al_2O_3.3H_2O$, are particularly effective. Other additives that have been proposed include alumina, magnesia and magnesia hydrates. However, polymeric compositions containing anti-tracking additives suffer from the disadvantage that when subjected to high voltage stress, they fail as a result of progressive erosion of the material. In addition, effective amounts of anti-tracking additives are somewhat higher than is desirable, e.g. 50 to 90% of the composition (percentages are by weight throughout this specification), particularly when the composition contains a hydrated additive and is subjected to conditions which cause loss of water of hydration, e.g. during extrusion, moulding or cross-linking. One solution to the erosion problem, as described in British Pat. Nos. 1337951 and 1337952 and U.S. application Ser. No. 434,126 (the disclosures of which are hereby incorporated by reference), is to incorporate in the composition an oxide of an element of the transition series, lanthanide series or non-transuranic actinide series, e.g. iron oxide.

SUMMARY OF THE INVENTION

We have now discovered that the incorporation of phosphorus compounds can improve the resistance to erosion of polymeric compositions containing anti-tracking additives, and can in addition reduce the amount of anti-tracking additive required. In many cases these phosphorus compounds show advantages over the oxide known as erosion-inhibiting additives. For example, in contrast to the highly-colored oxides, these compounds have a neutral color and thus make it possible for the compositions to be pigmented to any desired color; this is highly important from an environmental viewpoint. The phosphorus compound should be one which is effective in improving the resistance of the composition to erosion by high voltage stress and which is a compound of the formula

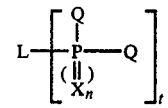

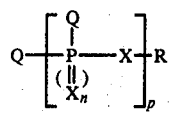

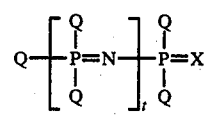

wherein
  n is 0 or 1;
  t is an integer;
  p is integer greater than 1;
  each of the X groups, which may be the same or different, is oxygen or sulphur;
  L is a t-valent organic group having the formula —R or —XR when t is 1;
  each of the Q groups, which may be the same or different, is a monovalent group of the formula —R or —XR or two Q groups attached to the same phosphorus atom together form a divalent organic group; and
  each of the R groups, which may be the same or different, is a hydrogen atom or an organic group, or a reaction product of a compound as defined above.

DETAILED DESCRIPTION OF THE PREFERRED EMBODIMENTS OF THE INVENTION

Preferred phosphorus compounds for use in the invention are (a) compounds of Formula I, II or III above wherein each of the R groups, which may be the same or different, is
  (i) a hydrogen atom;
  (ii) an aryl group;
  (iii) a substituted aryl group;
  (iv) a group which is such that the compound is capable of homopolymerisation or copolymerisation, which contains carbon and hydrogen and in which any other atoms are one or more of fluorine, chlorine, oxygen, sulphur, nitrogen, phosphorus and silicon;
  (v) an alkyl group; or
  (vi) an alkyl group substituted by one or more groups each of which consists of one or more atoms selected from carbon, hydrogen, fluorine, chlorine, oxygen, sulphur, nitrogen, phosphorus and silicon;
subject to the provisos that, unless at least one of the Q groups is a grouup which renders said compound capable of polymerisation (i.e. homopolymerisation or copolymerisation),
  (1) when n is 1, and each of the Q groups is an —XR group, and two or more of the Q groups are O-alkyl or O-aralkyl groups, the molecular weight of the compound is at least 382;
  (2) when n is 0 and each of the Q groups is an X-alkyl group, at least one of the X's is oxygen and the molecular weight of the compound is at least 442; and
  (3) no phosphorus atom is directly bonded to more than two hydrogen atoms;

(b) a salt of said compound (a) containing a salt-forming acidic group, the cation in said salt being an ammonium or quaternary ammonium ion or a metal ion wherein the metal is a metal having an atomic number less than 56 and belonging to Group IA, IIA, IIB, IIIA, IIIB, IVA, IVB, VA, VB, VIA, VIIB and VIII; or (c) a complex of a said compound wherein n is 0 and a metal salt wherein the metal is a transition metal other than copper.

The phosphorus-containing compound can be mixed with the polymer or with a precursor of the polymer in any way which ensures satisfactory dispersion thereof. For example, the anti-tracking additive can be mixed with the polymer or after the phosphorus compound, or the phosphorus compound and the anti-tracking additive can be premixed and added together to the polymer. When the polymer is thermoplastic, the phosphorus compound and anti-tracking additive are preferably added to the molten polymer using conventional blending techniques. Preferably the phosphorus compound is soluble in the polymer or is liquid under the conditions of mixing; if it is not, its particle size is preferably less than 75 microns, especially less than 45 microns, so as to ensure adequate dispersion thereof.

One or more phosphorus compounds, one or more anti-tracking additives and one or more polymers can be used together. Depending upon the nature of the phosphorus compound and the other ingredients, the conditions of mixing and subsequent processing conditions, the phosphoruus compound may polymerise or otherwise react with itself or another phosphorus compound (if present) and/or with the polymer (1) and/or with the anti-tracking additive(2). Accordingly the invention includes compositions comprising (1) a polymer, (2) an anti-tracking additive, and (3) a phosphorus-containing compound which is a compound (a), (b) or (c) as defined above or (d) a reaction product of one or more compounds (a), (b) or (c) with each other (including a homopolymer of a single phosphorus compound) and/or with the polymer (1) and/or with the anti-tracking additive (2). Such reaction products are preferably formed in situ in the polymer by the process described above, but can be performed in some cases.

The novel compositions can be moldable or extrudable compositions or in the form of shaped articles, including heat-recoverable articles and articles which have been heat-recovered around a substrate, especially generally tubular articles having one or more apertures therein for cable connection and termination, and other articles, e.g. heat-shrinkable sheds, for use in insulating parts of electrical apparatus, in particular high voltage (e.g. from 1 kv up to 400 kv or even higher, for example 5 to 35 kv) cable joints and terminations. The compositions may also be in the form of liquid compositions which can be coated onto a substrate and dried in situ through evaporation of a solvent, e.g. toluene, xylene or carbon tetrachloride, or through curing of a liquid prepolymer, e.g. a silicone.

The compositions may contain conventional additives, e.g. other fillers (including reinforcing fillers), pigments, antioxidants, and flame retardants. A particularly valuable and surprising property of the compositions is that they can be stabilised against ultraviolet radiation by incorporating therein a sufficient quantity of carbon black, generally in amounts up to 0.5%, e.g. about 0.3%, and sometimes as high as 1%. Presence of carbon black also helps to give the composition a gray color which is environmentally acceptable. In prior art compositions, except those described in British Pat. Nos. 1337951 and 1337952, it has not been possible to use carbon black as an ultraviolet stabiliser because it promotes failure by tracking, and it has therefore been necessary to use less effective stabilisers such as substituted benzophenones or benzotriazoles.

Referring now to the formulae I, II and III given above, t is generally 1, 2, 3 or 4 and p is usually less than 10. When two Q radicals together form a divalent organic radical, this may, for example, be an alkylene, oxyalkylene or dioxyalkylene group, or such a group having substituents thereon. The term "aryl group" is used herein to include aromatic groups having one or more heteroatoms in the ring, e.g. nitrogen, oxygen, silicon, sulphur or boron, as well as groups containing two or more condensed aromatic rings, for example penyl, naphthyl, pyrrolyl, furyl, thienyl, picolinyl, imidazolyl, purinyl and pyridyl groups. The term "alkyl group" is used herein to include linear, branched and cycloalkyl groups and such groups containing hetero atoms, e.g. sulphur or oxygen, in the chain; it is also used to include alkenyl groups which do not render the compound capable of homopolymerisation or copolymerisation. Examples of suitable alkyl groups include methyl, ethyl, propyl, butyl, amyl, hexyl, heptyl, octyl, nonyl, decyl, tetradecyl, octadecyl, cyclopropyl, cyclobutyl, cyclopentyl, cyclohexyyl, cyclooctyl, cyclodecyl, tetrahydrofuryl, tetrahydrothienyl, morpholinyl, piperidyl, pyrolidinyl, and 1,4-dioxanyl.

The presence of bromine substituents on an alkyl group in the phosphorus compound often appears to lead to relatively poor results, and it is preferred that any substituent present in the compound should consist of one or more atoms selected from carbon, hydrogen, fluorine, chlorine, oxygen, sulphur, nitrogen, phosphorus and silicon. Examples of suitable substituents are alkyl and aryl groups, Cl, $NO_2$, CN, $NR_2'$, OR', SR', COR', COOR', SOR' and $SO_2R'$ where R' is hydrogen or an alkyl group. Examples of substituted alkyl groups are nitrophenyl, chlorophenyl, 1,3-dichlorophenyl, cyanophenyl, methoxyphenyl, ethoxyphenyl, tolyl, 1,3-dimethylphenyl, phenoxyphenyl, hydroxyphenyl, aminophenyl, acetylphenyl, 2-methylnaphthyl, 1-nitronaphthyl, 1-chloronaphthyl, n-butylphenyl, t-butylphenyl, and 1,3-di-t-butylphenyl groups.

Examples of groups which render the phosphorus compound homopolymerisable or copolymerisable (e.g. with the polymer (1)) include alkenyl and alkynyl group, e.g. vinyl, allyl and other alkenyl and alkynyl groups containing up to ten carbon atoms. The use of such compounds give particularly good results, and it is theorised that this is due to the ability of such compounds to form higher molecular weight products in situ, especially by reaction with the polymer.

The amount of phosphorus compound (or moieties derived therefrom) which is preferably present depends upon the voltage stress to which the composition is likely to be exposed. Amounts as low as 0.1% can be effective, but generally amounts more than 0.25%, e.g. 0.25 to 5%, preferably 0.35 to 1.50%, are used.

The effectiveness of the phosphorus compounds depends in part upon the type of compound (i.e. the values of n, t and p, and whether the L and Q groups are —R or —XR groups), as further described below; however, it has been found that in general it is preferred that the compound should have one or more of the following features:

(a) it is an organic compound;

(b) it contains an ethylenically unsaturated group, especially at least one R group which comprises a vinyl or allyl group;

(c) it has a boiling point greater than 150° C. at a pressure of 2 mm Hg;

(d) at least one of the R groups is a phenyl or substituted phenyl group;

(e) at least one of the R groups is a substituted aryl group in which each of the substituents is an electron-attracting group and/or the substituents contain a total of at least six carbon atoms;

(f) at least one of the R groups is an alkyl group and the total number of carbon atoms in the R groups is at least 45;

(g) at least one of the Q radicals is an —OH or —SH group and the cation is nickel, cobalt, aluminum, zinc or calcium;

(h) it contains at least one C—P bond.

(i) it is substantially anhydrous.

Many of the phosphorus compounds as defined above can conveniently be divided into the following classes (1) Phosphoric acid and the phosphates, i.e. a compound of formula I in which n is 1, t is 1, and each of L and the Q groups is an —XR group, i.e. a compound of formula

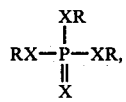

e.g. tri(2-ethyl hexyl) phosphate, triallyl phosphate, triphenyl phosphate and triphenyl thionophosphate; compounds of formula I in which n is 1, t is 2 or more, and each of the Q groups is an —XR group, i.e. a compound of formula

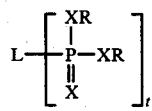

e.g. 4,4'-oxydiphenyl bis (2-phenylphenyl) diphenyl diphosphate; or a compound of formula II in which n is 1 and each of the Q groups is an —XR group, i.e. a compound of formula

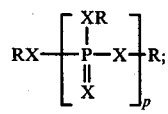

or a salt of such a compound, e.g. nickel phosphate or ammonium polyphosphate.

(2) Phosphorous acid and the phosphites, i.e. a compound of formula I in which n is 0, t is 1, L is an —XR group, i.e. a compound of formula and each of the Q groups is an —XR group, i.e. a compound of formula

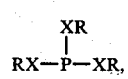

or a salt or complex thereof, e.g. trioctadecyl phosphite, which is preferred, trilauryl phosphite, triphenyl phosphite, tri(2-chloroethyl) phosphite and triallyl phosphite.

(3) Phosphonic acids and phosphonates, i.e. a compound of formula I in which n is 1, t is 1, L is an —R group, and each of the Q groups is an —XR group, i.e. a compound of formula

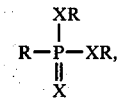

or a salt thereof; or a compound of formula I in which n is 1, t is preferably 2, 3, or 4, and each of the Q groups is an —XR group, i.e. a compound of formula

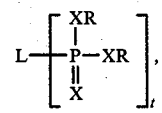

or a salt thereof. We have found that this class gives outstandingly good results, especially when the ratio of carbon atoms to phosphorus atoms in the organic compound is greater than 6:1, or at least one of the R groups is a vinyl or allyl group, or at least one of the R groups is a phenyl or substituted phenyl group. Preferred phosphonates are diethyl benzylphosphonate, di-n-octyldecyl 3,5-di-t-butyl-4-hydroxy-benzylphosphonate, diamyl amylphosphonate, nickel bis-(ethyl 3,5-di-t-butyl-4-hydroxy-benzylphosphonate), aluminum tri-(ethyl benzylphosphonate), phenylphosphonic acid, diethyl vinylphosphonate, diallyl allylphosphonate, diallyl phenylphosphonate, di-2-chloroethyl vinylphosphonate, zinc phenylphosphonate, calcium phenylphosphonate, nickel phenylphosphonate, di-2-chloroethyl 1,4,5,6,7,7-hexachloro-5-norbornenyl-2-phosphonate, diallyl, 1,2(di-allyloxycarbonyl)ethylphosphonate or 2,4,6-tris(-diallyl phosphono)-s-triazine. Other examples of phosphonates are diethyl ethylphosphonate, tetraethyl ethylenediphosphonate and 2,4,6-tris(diethyl phosphone)-s-triazine.

(4) Phosphinic acids and the phosphinates, i.e. a compound of formula I, in which n is 1, t is 1, L is an —R group, one of the Q groups is an —R group and the other Q group is an —XR group, i.e. a compound of formula

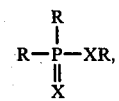

or a salt thereof, e.g. zinc and cobaltous bis-(dicyclohexyldithiophosphinate), diphenylphosphinic acid and ammonium diphenylphosphinate.

(5) Phosphonous acids and the phosphonites, i.e. a compound of formula I, in which n is 0, t is 1, L is an —R group, and each of the Q groups is an —XR group, i.e. a compound of formula

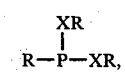

or a salt or complex thereof, e.g. diethyl phenylphosphonite, monosodium hydrogen phenylphosphonite or methyl hydrogen methylphenylphosphonite.

(6) The phosphinites, i.e. a compound of formula I in which n is 0, t is 1, L is an —R group, one of the Q groups is an —R group and the other Q group is an —XR group, i.e. a compound of formula

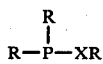

or a salt or a complex thereof, e.g. phenyl diphenylphosphinite or its complex with nickelous chloride.

(7) The phosphine oxides and sulphides, i.e. an organic compound of formula I in which n is 1 and each of L and the Q groups is an —R group, i.e. a compound of formula

e.g. tris (3-propionamido) phosphine exide, trioctylphosphine oxide or tris-(2-ethylhexyl)phosphine oxide, which are preferred, and triphenylphosphine oxide and sulphide.

(8) The phosphines, i.e. an organic compound of formula I in which n is 0 and each of L and the Q groups is an —R group, i.e. a compound of formula

or a complex thereof, e.g. tris-(3-cyanopropyl)phosphine, which is preferred, and triphenylphosphine.

The anti-tracking additive is preferably alumina, alumina hydrate, magnesia or magnnesia hydrate having a surface area of at least 1 m²/g. (Surface areas referred to herein are average surface areas measured by the Brunauer Emmett Teller method.) Particularly preferred are alumina hydrates, especially the trihydrate, those having high surface areas, e.g. at least 4 m²/g, preferably at least 6 m²/g, especially at least 8 m²/g, giving the best results. The particle size of the alumina hydrate is preferably less than 2 microns, especially less than 1.6 microns. Suitable alumina hydrates are well known and include those disclosed in British Pat. Nos. 1337951 and 1337952.

The amount of alumina trihydrate or other anti-tracking additive which is preferably present depends upon the voltage stress to which the composition is likely to be exposed and the way in which the composition is to be applied to the substrate to be insulated. Generally the presence of the phosphorus compound will reduce the amount of anti-tracking additive needed, with a consequent improvement in physical properties. The amount (based on the total composition) can be as low as 15%, but is usually at least 20%, for example, 20 to 75%, preferably 20 to 60% or 20 to 40%. For compositions which are to be converted into heat-recoverable articles or which are in the form of heat-recoverable or heat-recovered articles, rather lower amounts, e.g. from 15 to 45% are generally preferred, in order to minimise the development of porosity and to ensure satisfactory physical properties.

The polymer used in this invention may be any polymer normally used for high voltage insulation, but is generally a polysiloxane, an epoxide resin, e.g. a cycloaliphatic epoxide resin, or a polymer which consists essentially of units derived from one or more olefins and/or from one or more substituted olefins, e.g. a polyacrylate, preferably one or more of polyethylene, an ethylene/ethylacrylate copolymer, an ethylene/vinyl acetate copolymer, an ethylene/propylene copolymer, an ethylene/propylene/non-conjugated-diene terpolymer and polypropylene. Other specific polymers include polydimethyl siloxane, dimethyl siloxane/methyl vinyl siloxane copolymers, fluoro silicones, e.g., those derived from 3,3,3-trifluoropropyl siloxane, carborane siloxanes, polybutyl acrylate butyl/ethyl acrylate copolymers, butyl acrylate/glycidyl methacrylate copolymers, polybutene, butyl rubbers and ionomeric polymers, e.g., "Surlyn" materials sold by DuPont, and mixtures of any two or more of the above. For applications requiring heat-recoverable articles, the polymer is preferably a crystalline cross-linked or cross-linkable polymer. Methods of making heat-recoverable articles are well-known in the art (see for example, U.S. Pat. No. 3,086,242).

Although the primary purpose of the novel compositions is to prevent tracking and inhibit erosion, we have found that they are also effective in stabilizing the insulation under arcing conditions, i.e., in cases where a direct arc passes between two parts of an electrical apparatus forming a carbonaceous track along its line.

Many of the phosphorus compounds useful in the present invention are known compounds, and those compounds which are new can be prepared by methods known per se. Among the new compounds are 4,4'-oxydiphenyl bis (2-phenylphenyl) diphenyl diphosphate, nonaphenyl heptaphosphate, bis (2-chloroethyl) 1,4,5,6,7,7-hexachloro-5-norbornenyl-2-phosphonate, nickelous phenylphosphonate and the complex of phenyl diphenylphosphinite and nickelous chloride.

The invention is illustrated in the following Examples, which are summarized in the Table below, and in each of which the named phosphorus compound was incorporated into a composition consisting of, in Examples 1 to 6,

|  | Parts By Weight |
| --- | --- |
| Ethylene propylene diene-modified rubber | 100 |
| Low density polyethylene | 100 |
| Alumina trihydrate of surface area 12–15 m²/g | 75 |
| Tetrakis [methylene 3-(3', 5'-di-t-butyl-4'-hydroxyphenyl) propionate]methane (an antioxidant) | 4 |
| Triallyl isocyanurate (a curing aid) | 1 |
| 2,5-dimethyl-2,5-di(t-butylperoxy)hexyne-3 (a cross-linking agent) | 5 | and in the other Examples, of the same ingredients and in addition 1.4 parts of a dispersion of SAF carbon black (0.07 parts) in polyethylene.

The amount of phosphorus compound added was 4 parts by weight except in Examples 1 and 7 (none, for controls), Example 2 (0.25 parts), Example 3 (0.50 parts), Example 4 (1.0 parts) and Example 5 (2.0 parts). Samples weighing 40 g. were press-cured at 190° C. for 10 minutes and were tested by the procedure of ASTM D 2303 at a constant voltage of 3.0 KV. At least four samples of each type were tested, the test being terminated after 300 minutes if failure has not occurred by then. The average weight loss (in g/min) of the samples was calculated and is reported in the Table. The Table also reports the failure time (in minutes) and the figure given is the average of the failure times of all the samples, assigning an arbitrary failure time of 300 minutes to those samples which did not fail. Those times which are averaged from a set of figures including an arbitrary 300 minute figure are marked with an asterisk; thus a failure time of 300* indicates that none of the samples had failed after 300 minutes of testing. For those samples which failed, the mode of failure was by erosion alone except in Examples 18, 24, 39 and 43 in which the erosion was accompanied by flames.

Table

| Ex No. | Phosphorus Compound | Failure Time | Weight Loss |
|---|---|---|---|
| 1(c) | None | 83 | 0.04 |
| 2. | Nickel bis(ethyl 3,5-di-t-butyl-4-hydroxybenzylphosphonate) | 87 | 0.05 |
| 3. | | 119 | 0.04 |
| 4. | | 300* | 0.001 |
| 5. | | 300* | 0.001 |
| 6. | | 300* | 0.0007 |
| 7(c) | None | 83 | 0.045 |
| 8. | Tri(2-ethylhexyl) phosphate | 212* | 0.026 |
| 9. | Triphenyl phosphate | 150 | 0.034 |
| 10. | Triphenyl thionophosphate | 142* | 0.026 |
| 11. | 4,4'-oxydiphenyl bis(2-phenylphenyl) diphenyl diphosphate | 268* | 0.005 |
| 12. | Nonaphenyl heptaphosphate | 235* | 0.019 |
| 13. | Trilauryl phosphite | 156 | 0.035 |
| 14. | Triphenyl phosphite | 132* | 0.038 |
| 15. | Trioctadecyl phosphite | 300* | 0.001 |
| 16. | Tris(2-chloroethyl) phosphite | 152* | 0.035 |
| 17. | Diethyl benzyl phosphonate | 300* | 0.0008 |
| 18. | Diethyl ethylphosphonate | 123 | 0.037 |
| 19. | Di-n-octadecyl 3,5-di-t-butyl-4-hydroxybenzylphosphonate | 300* | 0.0008 |
| 20. | Diamyl amylphosphonate | 300* | 0.0014 |
| 21. | Nickel bis(ethyl 3,5-di-t-butyl-4-hydroxybenzylphosphonate) | 300* | 0.0007 |
| 22. | Aluminium tris(ethyl benzylphosphonate) | 300* | 0.001 |
| 23. | Phenylphosphonic acid | 300* | 0.0004 |
| 24. | Diethylphosphonate | 248* | 0.0008 |
| 25. | Diethyl vinylphosphonate | 300* | 0.0006 |
| 26. | Tetraethyl ethylenediphosphonate | 143* | 0.0321 |
| 27. | Diallyl phenylphosphonate | 300* | 0.0006 |
| 28. | Bis-2-chloroethyl vinylphosphonate | 300* | 0.0004 |
| 29. | Zinc phenylphosphonate | 300* | 0.0012 |
| 30. | Bis-2-chloroethyl 1,4,5,6,7,7-hexachloro-5-norbornenyl-2-phosphonate | 300* | 0.0008 |
| 31. | 2,4,6-tris(diethyl phosphono)-1,3,5-triazine | 133 | 0.033 |
| 32. | Calcium phenylphosphonate | 300* | 0.0014 |
| 33. | Nickel phenylphosphonate | 300* | 0.0006 |
| 34. | 2,4,6-tris(diallyl phosphono)-1,3,5-triazine | 300* | 0.0003 |
| 35. | Diallyl 1,2-bis(allyloxycarbonyl)ethylphosphonate (tetrallyl phosphonosuccinate) | 300 | 0.0006 |
| 36. | Cobaltous bis(dicyclohexyldithiophosphinate) | 249* | 0.0007 |
| 37. | Zinc bis(dicyclohexyldithiophosphinate) | 262* | 0.0007 |
| 38. | Diphenylphosphinic acid | 242* | 0.015 |
| 39. | Ammonium diphenylphosphinate | 193* | 0.033 |
| 40. | Diethyl phenylphosphonite | 246* | 0.009 |
| 41. | Monosodium phenylphosphonite | 231* | 0.009 |
| 42. | Methyl hydrogen methylphenylphosphonite | 154* | 0.038 |
| 43. | Phenyl diphenylphosphinite | 237* | 0.004 |
| 44. | Phenyl diphenylphosphinite nickelous chloride complex | 289* | 0.004 |
| 45. | Tris(3-propionamido)phosphine oxide | 300* | 0.0003 |
| 46. | Trioctylphosphine oxide | 300* | 0.0005 |
| 47. | Triphenylphosphine sulphide | 252* | 0.009 |
| 48. | Tris(2-ethylhexyl)phosphine oxide | 300* | 0.0008 |
| 49. | Tris(3-cyanoethyl)phosphine | 300* | 0.0006 |
| 50. | Triphenylphosphine | 283* | 0.008 |
| 51. | Diphenyl phosphonimido triphenylphosphorane | 246* | 0.0121 |
| 52. | Nickel phosphate | 246* | 0.0009 |
| 53. | Ammonium polyphosphate | 206* | 0.0166 |
| 54. | Triallyl phosphite | 295* | 0.0042 |
| 55. | Triallyl phosphate | 210* | 0.0119 |
| 56. | Hexallyl N,N'-di(phosphonosuccinyl)-2,4-diamino-1-toluene | 300* | 0.0003 |
| 57. | Diallyl allylphosphonate | 262* | 0.0074 |

We claim:

1. A high voltage insulating composition comprising
(1) a polymer;
(2) an anti-tracking additive effective in reducing tracking; and
(3) a phosphorus-containing compound effective in improving the resistance of the composition to erosion by high voltage stress, said compound being selected from (a) complexes of a metal salt wherein the metal is a transition metal other than copper, and a compound having a formula selected from

(I)

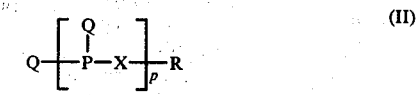

(II)

wherein
t is 1;
p is integer greater than 1;
X is independently selected from oxygen and sulphur;
L is an —R group;
one of the Q groups is an —R group and the other Q group is an R group or an —XR group; and
R is independently selected from hydrogen atoms and organic groups; and (b) reaction products derived from the reaction of at least one said complex in the presence of the polymer to form higher molecular weight products.

2. A composition according to claim 1 wherein the anti-tracking additive is selected from alumina, alumina hydrates, magnesia and magnesia hydrates.

3. A composition according to claim 1 which contains an amount of at least 0.25% by weight of said phosphorus-containing compound and moieties derived therefrom.

4. A composition according to claim 3 wherein the amount is 0.25% to 5% by weight.

5. A composition according to claim 1 wherein at least one of the R groups is selected from phenyl and substituted phenyl groups.

6. A composition according to claim 1 wherein at least one of the R groups is selected from aryl groups, substituted aryl groups in which each of the substituents is an electron-attracting group; substituted aryl groups in which the substituents contain a total of at least six carbon atoms; and alkyl groups which together with the other R groups contain a total number of carbon atoms which is at least 45.

7. A composition according to claim 1 wherein t is 1, L is an —R group, one of the Q groups is an —R group and the other Q group is an —XR group.

8. A composition according to claim 1 wherein each of L and the Q groups is an —R group.

9. A composition according to claim 1 wherein the phosphorus-containing compound is a complex of nickelous chloride and phenyl diphenylphosphonite.

10. A composition according to claim 1 wherein the polymer (1) is selected from the group consisting of polysiloxanes, epoxide resins and polymers which consist essentially of units derived from at least one ethylenically unsaturated compound selected from olefins and substituted olefins.

11. A composition according to claim 10 wherein the polymer (1) is cross-linked.

12. A composition according to claim 1 which also contains up to 1% by weight of carbon black.

13. A composition according to claim 1 which is in the form of a recoverable article.

14. Insulated electrical apparatus in which at least a part of the insulation is a composition as claimed in claim 1.

15. Insulated electrical apparatus according to claim 14 which is a high voltage cable having a said composition as at least part of the insulation at its termination.

16. A composition according to claim 1 which contains from 0.25 to 5% by weight of said phosphorus-containing compound.

17. A composition according to claim 1 which contains from 0.35 to 1.5% by weight of said phosphorus-containing compound.

* * * * *